(12) United States Patent
Zhang

(10) Patent No.: US 10,318,800 B2
(45) Date of Patent: Jun. 11, 2019

(54) GESTURE DETECTION AND RECOGNITION METHOD AND SYSTEM

(71) Applicant: YUTOU TECHNOLOGY (HANGZHOU) CO., LTD., Zhejiang (CN)

(72) Inventor: Hongxin Zhang, Zhejiang (CN)

(73) Assignee: YUTOU TECHNOLOGY (HANGZHOU) CO., LTD., Zhejiang (CN)

( * ) Notice: Subject to any disclaimer, the term of this patent is extended or adjusted under 35 U.S.C. 154(b) by 0 days.

(21) Appl. No.: 15/739,274

(22) PCT Filed: Jun. 13, 2016

(86) PCT No.: PCT/CN2016/085625
§ 371 (c)(1),
(2) Date: Jan. 3, 2018

(87) PCT Pub. No.: WO2017/000764
PCT Pub. Date: Jan. 5, 2017

(65) Prior Publication Data
US 2018/0293433 A1 Oct. 11, 2018

(30) Foreign Application Priority Data
Jun. 30, 2015 (CN) .......................... 2015 1 0381721

(51) Int. Cl.
| G06K 9/00 | (2006.01) |
| G06F 3/01 | (2006.01) |
| G06K 9/46 | (2006.01) |
| G06K 9/62 | (2006.01) |
| G06F 3/03 | (2006.01) |

(52) U.S. Cl.
CPC .......... *G06K 9/00355* (2013.01); *G06F 3/01* (2013.01); *G06F 3/017* (2013.01); *G06K 9/4652* (2013.01); *G06K 9/628* (2013.01); *G06F 3/0304* (2013.01)

(58) Field of Classification Search
CPC .......... G06K 9/00335; G06K 9/00355; G06K 9/4652; G06K 9/6227; G06K 9/6267; G06K 9/628; G06T 7/20; G06T 7/90; G06F 3/017
See application file for complete search history.

(56) References Cited

U.S. PATENT DOCUMENTS

| 8,615,108 | B1 * | 12/2013 | Stoppa et al. | ....... G06K 9/4671 |
| | | | | 382/103 |
| 2002/0118880 | A1 * | 8/2002 | Liu et al. | ................. G06F 3/017 |
| | | | | 382/199 |
| 2014/0010441 | A1 * | 1/2014 | Shamaie | ............ G06K 9/00355 |
| | | | | 382/164 |

FOREIGN PATENT DOCUMENTS

| CN | 101763515 A | 6/2010 | ............... G06K 9/66 |
| CN | 102508547 A | 6/2012 | ............... G06F 3/01 |
| CN | 103376890 A | 10/2013 | ............... G06F 3/01 |

OTHER PUBLICATIONS

PCT/CN2016/085625, ISR and Written Opinion, dated Sep 22, 2016, 7 pages—English, 6 pages—Chinese.

\* cited by examiner

*Primary Examiner* — Andrew W Johns
(74) *Attorney, Agent, or Firm* — Andrew F. Young, Esq.; Lackenbach Siegel, LLP

(57) ABSTRACT

Disclosed are a gesture detection and recognition method and system. The gesture detection and recognition method comprises: acquiring and storing an image; adopting a plurality of pre-set classifiers for deleting different gestures to detect each frame of the image according to a pre-set sequence in a frame alternating manner to acquire a gesture target; establishing a skin color model based on the pixel distribution of the region of the gesture target; and acquiring gesture frequencies of the gesture target in a previous state and a later state according to the skin color model, and matching the gesture frequencies with a pre-set gesture state, so that a gesture change state is obtained and output. The gesture detection and recognition method and extract a skin color under specific scene, and can gradually eliminate the influence generated by acute illumination changes, thus realizing the purpose of extracting a gesture change state.

11 Claims, 2 Drawing Sheets

GESTURE DETECTION AND RECOGNITION METHOD AND SYSTEM

CROSS-REFERENCE TO RELATED APPLICATIONS

The present application claims priority to and the benefit of PCT/CN2016/085625 filed Jun. 13, 2016, the entire contents of which are incorporated herein by reference which in turn claims priority to Chinese Patent Application No. CN 201510381721.6, filed on Jun. 30, 2015.

BACKGROUND OF THE INVENTION

1. Field of the Invention

The present invention relates to the field of human-computer interaction, and more particularly to a method and system of gesture detection and recognition.

2. Description of the Related Art

With the development of computer technology, computer processing technology is becoming stronger and stronger. The original human-computer interaction technology is unable to meet people's needs, so people begin to find more natural and intelligent way of interaction. 2D or 3D technology is generally used in gesture detection and state recognition techniques. As hand is a elastic object, there will be a big difference in the same gesture, and there may be some similarities among different gestures, and gestures differ among different people, in addition, gesture contains relatively large amount of redundant information, whereby people will unconsciously produce a lot of gestures, therefore, it could be demanding in terms of arithmetic capability of recognition technology and accuracy of recognition. However, the existing recognition technology cannot quickly recognize the multi-gesture changes, with low accuracy of recognition and poor real-time; and is more sensitive to light, while light of different intensities and from different directions (such as polarized light or no compensation light source) will produce different shadows directly affecting the accuracy of identification, leading to the result that target of hand area of interest cannot be extracted against the complex background.

SUMMARY OF THE INVENTION

Given the foregoing problems of prior art, there is now provided a method and system of gesture detection and recognition, aiming for realizing quick recognition of hand gesture changes in the context of polarized light or no compensation light source.

Detailed technical solution is as follows:

A method of gesture detection and recognition comprises the steps of:

A1. Collecting images and storing the images;

A2. Using preset multiple classifiers used for detecting different gestures to detect each frame of the images in the way of alternating every two frames in preset order, to acquire gesture targets;

A3. Establishing skin color models based on pixel distribution in target area of the gestures;

A4. Acquiring gesture frequency of said gesture target in two consecutive states according to the skin color model, and match said gesture frequency with preset gesture state, to acquire gesture transition state and output.

Preferably, the image is preprocessed prior to performing the step A2.

Preferably, each of said classifiers performs multi-scale target detection of said image through a preset sliding window, to obtain said gesture target.

Preferably, after said gesture target is obtained, said window is expanded by four times to detect said gesture target.

Preferably, said classifiers employ cascade classifiers.

A gesture detection and recognition system comprising:

Acquisition unit for collecting images;

Storage unit connecting to said acquisition unit for storing said images;

A plurality of classifiers for detecting different gestures connecting to said storage unit for detecting each frame of said images in the way of alternating every two frames in preset order, to obtain gesture target;

Skin color modeling unit connecting to said storage unit for establishing skin color models based on pixel distribution in said target area of the gestures;

Decision making unit connecting to a plurality of said classifiers and said skin color modeling units respectively, acquiring gesture frequency of said gesture targets in two consecutive states according to the skin color model, and match said gesture frequency with preset gesture state, to acquire gesture transition state and output.

Said acquisition unit employs video camera.

Said classifiers employ cascade classifiers.

Said classifiers all perform multi-scale target detection of said image through a preset sliding window, to obtain said gesture target.

After said classifiers obtain said gesture target, said window will be expanded by four times to detect said gesture target.

The beneficial effect of the above technical solution is as follows:

In the present technical solution, the gesture detection and recognition method can perform real-time skin color modeling in the target area of detected gesture based on pixel distribution, to realize extracting skin color in particular scenes, and can gradually eliminate the impact generated by tempestuous changes of light, thus realize the purpose of extracting gesture transition state. The gesture detection and recognition system can detect the light, the shooting angle, the size and gestures with different skin colors, and the recognition accuracy can reach more than 90%, a high accuracy.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
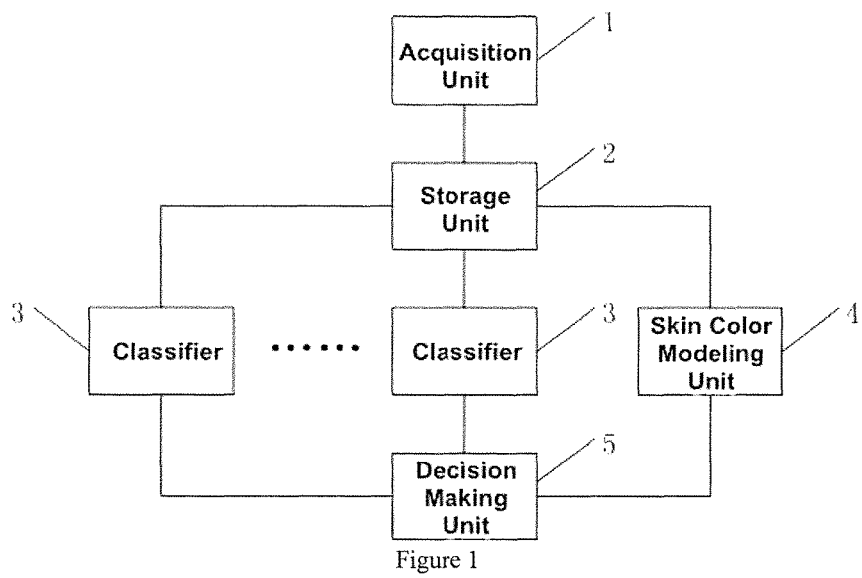
FIG. 1 is a block diagram of an embodiment of said gesture detection and recognition system of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

A method of gesture detection and recognition comprises the steps of:

A1. Collecting images and storing the images;

A2. Using preset multiple classifiers used for detecting different gestures to detect each frame of the images in the way of alternating every two frames in preset order, to acquire gesture targets;

A3. Establishing skin color models based on pixel distribution in target area of the gestures;

A4. Acquiring gesture frequency of said gesture target in two consecutive states according to the skin color model, and match said gesture frequency with preset gesture state, to acquire gesture transition state and output.

In the present technical solution, the gesture detection and recognition method can perform real-time skin color modeling in detected area of gesture target based on pixel distribution, to realize extracting skin color in particular scenes, and can gradually eliminate the impact generated by tempestuous changes of light, thus realize the purpose of extracting gesture transition state. The gesture detection and recognition method can be applied in robotic system. Robot can collect gestures of various positions appearing anywhere in the view in the context of polarized light or no compensation light source, to obtain gesture transition states in real time.

During the process of establishing skin color model, the detected image color space of gesture target area can be converted into YUV (YUV is a color encoding method adopted by European Television System (belongs to PAL), which is color space adopted by PAL (PAL) and SECAM (SECAM) to simulate the color television standards), to remove the Y component to eliminate the effect of the illumination. Since the skin color pixels in this region are Gaussian distribution, the mean and variance of the UV value of the region are calculated to update the mean variance of the overall skin color. Then the skin color model can be established in real time, the background is removed and the accuracy is improved.

In a preferred embodiment, the image is preprocessed before performing step A2.

The preprocessing in the present embodiment can be carried out in the way of histogram equipoise, using accumulation function to "adjust" grey value to achieve the enhancement of contrast, thereby eliminating the effect of the illumination, and increasing the dynamic range of the pixel gray value by using the histogram equalization such that the effect of enhancing the overall contrast of the image can be achieved.

In a preferred embodiment, each classifier performs multi-scale target detection of image through a preset sliding window, to obtain said gesture target.

The classifier uses Adaboost algorithm for training. Adaboost is an iterative algorithm, and the main idea is to train a training set to a plurality of different weak classifier (Weak Classifier), then bring these weak classifiers together to be combined into a strong classifier. It determines the weight of each sample based on the correctness of each sample classification in each training set and the accuracy of the previous general classification, while the lower classifier is trained on the basis of these new weights. The cascade classifier obtained in the end is formed by the combination of weighting of classifiers obtained in training.

Further, the classifier can be trained using LBP feature (Local Binary Pattern).

The LBP feature is an operator used to describe the local texture feature of an image. It has remarkable advantages, such as rotation invariance and grayscale invariance.

In the present embodiment, a sliding window having the same size as the training image is used to perform multi-scale target detection of image.

In a preferred embodiment, after gesture target is obtained, the window will be expanded by four times to detect gesture target.

Since the distance of hand movement between each frame of image is not big, in order to increase the speed, each time the gesture target is detected, it can be predicted by expanding detection window as next frame of gesture target, and the next frame of input image only takes image in the window, to improve the detection speed.

Further, the length and width of the original window can be doubled.

In a preferred embodiment, the classifiers use cascade classifiers.

In the present embodiment, by using cascade classifier, the light, the shooting angle, the size and gestures with different skin colors can be detected, and the recognition accuracy can reach more than 90%, a high accuracy.

As shown in FIG. 1, a gesture detection and recognition system comprising:

An acquisition unit 1 for collecting an image;

A storage unit 2 connecting to the acquisition unit 1 for storing images;

A plurality of classifiers 3 for detecting different gestures, connecting to storage unit 2, for detecting each frame of images in the way of alternating every two frames in preset order, to obtain gesture target;

Skin color modeling unit 4 connecting to storage unit 2 for establishing skin color models based on pixel distribution in target area of the gestures;

Decision making unit 5 connecting to a plurality of classifiers and skin color modeling units respectively, acquires gesture frequency of gesture target in two consecutive states according to the skin color model, and matches gesture frequency with preset gesture state, to acquire gesture transition state and output.

In the present embodiment, classifier 3 in the gesture detection and recognition system can detect the light, the shooting angle, the size and gestures with different skin colors, and the recognition accuracy can reach more than 90%, a high accuracy.

Skin color modeling unit 4 can establish skin color models in the area of detected gesture target based on pixel distribution, and extract skin color in particular scenes, and can gradually eliminate the impact generated by tempestuous changes of light. Skin color modeling unit 4 can convert the detected image color space of gesture target area into YUV, to remove the Y component to eliminate the effect of the illumination. Since the skin color pixels in this region are Gaussian distribution, the mean and variance of the UV value of the region are calculated to update the mean variance of the overall skin color. Then the skin color model can be established in real time, the background is removed and the accuracy is improved.

In a preferred embodiment, the acquisition unit 1 employs a video camera.

Further, the video camera can use a high-definition camera with an acquisition speed of 30 frames per second.

In a preferred embodiment, the classifier 3 employs a cascade classifier.

In the present embodiment, by using cascade classifier 3, the light, the shooting angle, the size and gestures with different skin colors can be detected, and the recognition accuracy can reach more than 90%, a high accuracy.

In a preferred embodiment, classifiers 3 all perform multi-scale target detection of image through a preset sliding window, to obtain gesture target.

The classifier 3 uses Adaboost algorithm for training. Adaboost is an iterative algorithm, and the main idea is to train a training set to a plurality of different weak classifier (Weak Classifier), then bring these weak classifier together to be combined into a strong classifier. It determines the weight of each sample based on the correctness of each sample classification in each training set and the accuracy of the previous general classification, while the lower classifier is trained on the basis of these new weights. The cascade classifier obtained in the end is formed by the combination of weighting of classifiers obtained in training.

Further, the classifier 3 can be trained using LBP feature (Local Binary Pattern).

The LBP feature is an operator used to describe the local texture feature of an image. It has remarkable advantages, such as rotation invariance and grayscale invariance.

In the present embodiment, a sliding window having the same size as the training image is used to perform multi-scale target detection of image.

In a preferred embodiment, after classifier 3 obtains the gesture target, the window will be expanded by four times to detect gesture target.

Since the distance of hand movement between each frame of image is not big, in order to increase the speed, each time the gesture target is detected, it can be predicted by expanding detection window as next frame of gesture target, and the next frame of input image only takes the image in this window, to improve the detection speed.

Further, the length and width of the original window can be doubled.

Figure 2:
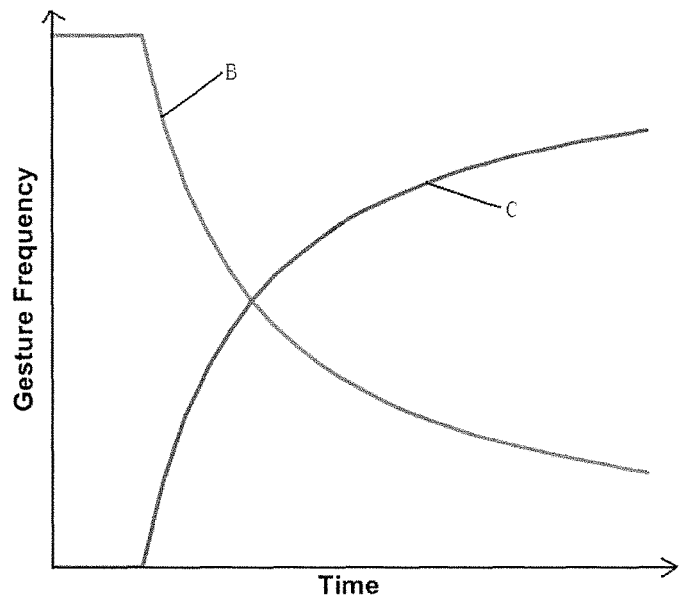
FIG. 2 is a curve chart of gesture frequency changes with respect to fist-to-palm and palm-to-fist.

For different gestures, relevant classifiers can be trained for corresponding gestures. For instance, specific fist-palm is used to train for corresponding first classifier and palm classifier for gesture detection and recognition: in order to improve the speed of calculation, different classifiers can be used to detect the gestures in the way of alternating every two frames. In the real life, gesture can be constant for a certain period of time, so in one frame, one of the classifiers is used to detect the gesture, and if gesture is not detected by another classifier in the nest frame, it can be assumed that the previous gesture state still exists. In order to recognize the change of state, it is assumed that the gesture frequency F (gesture)=gesture duration time/detection time, and it can smooth the false detection; reduce the interference to state recognition. Ideally, the fist-palm and palm-fist on the gesture frequency variations should be consistent with that shown in the FIG. 2, that is, the intersection of the two is the gesture state variation. In practical application: When a gesture is detected, select an area in its vicinity as the next frame detection window, to improve the detection speed and reduce the false detection rate. In order to respond quickly to gesture variations, a shorter sliding window is used in calculating the gesture frequency F, whose length is related to the gesture change time. Since the abscissa of the intersection of the two frequencies f1 and f2 is not necessarily an integer, a threshold value T is set, and when the absolute difference between f1 and f2 is within the threshold value T, a state change is considered to occur. This threshold value T has a great effect on response speed and accuracy. By observing the frequency curve, it can be seen that f1 decreases and f2 rises when changing from state B to state C. Therefore, according to the calculated two gestures frequencies, it can be determined that his change is the fist-palm or palm-fist.

In the process of gesture detection: change of fist-palm, palm-fist usually occurs within 0.5 seconds, so a length of 15 frames of the sliding window may be selected. By the method of using the classifier alternately every two frames, and narrowing the detection range, the detection recognition speed can be increased and the false detection rate can be reduced at the same time. The defined frequency function is used to smooth the false detection noise, and the corresponding state change is recognized through the change of the frequency, and it can work quickly and accurately, with the response speed being kept within 100 ms.

Figure 3:
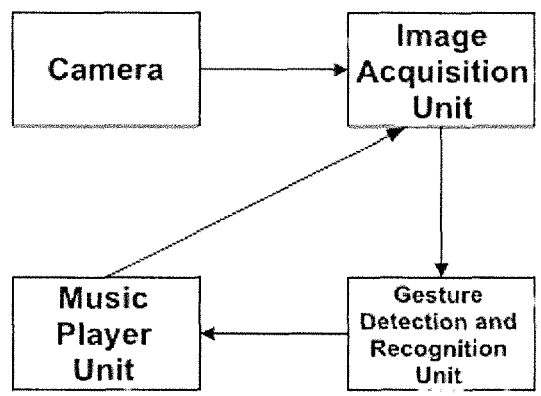
FIG. 3 is a schematic diagram of gesture music control system.

On the basis of the above technical solution, as shown in FIG. 3, the gesture detection and recognition technique can be applied to the gesture music control, and a high-definition camera can be connected to the embedded system of the robot via the MIPI or USB interface. The robot embedded computing system may include hardware and software operating environment, wherein the system includes an image acquisition unit, a gesture detection and recognition unit, and a music player unit.

The specific control process of the gesture music control system is: the robot send request to the image acquisition unit while playing the music at the same time, then the driver software accepts the request, transmits the image collected by the camera to the gesture detection and recognition unit for detecting and determining the specific gesture, afterwards, the calculated result is transmitted to the music player unit, and the music player unit obtains the result and executes the predetermined corresponding command. For instance, when user issues a fist (palm-fist) operation, music pauses; the user issues a (fist-palm) operation of opening fingers, music continues.

The invention has the advantages that the pre-established skin color model adopted by the existing recognition technology does not apply to certain specific scenes, while the real-time skin color model adopted in the present invention can be applied to the scene at that time, and can eliminate the impact generated by tempestuous changes of light; The technical solution can be embedded in the robot system, therefore, the LBP feature is adopted. It is an integer operation. Compared with the histogram of Oriented Gradient (HOG), the calculation amount is greatly reduced, allowing the system to calculate more quickly. The position of the gesture target area is prejudged on the basis of the previous frame to reduce the image area size, and the running speed can be greatly improved, and the partial background effect is eliminated, the false detection rate can be thereby reduced. By using classifiers of different gestures alternatively every two frames, detection speed can be increased; false detection noise can be smoothed using gesture frequency, using a shorter sliding window to make a real-time response to changes in gesture states.

The foregoing is only a preferred embodiment of the present invention and is not intended to limit the description and the scope of protection of the invention, and it will be appreciated by those skilled in the art that equivalent replacement using the specification and drawings of the present invention, and solution with apparent changes to specification and drawings of the present invention are to be included within the scope of the present invention.

What is claimed is:

1. A gesture detection and recognition method, wherein: the method comprises the steps of:
    A1. collecting images and storing the images;
    A2. using preset multiple classifiers used for detecting different gestures to detect each frame of the images in a way of alternating every two frames in preset order, to acquire gesture targets;
    A3. establishing skin color models based on pixel distribution in target area of the gestures;
    A4. acquiring gesture frequency of said gesture target in two consecutive states according to the skin color model, and match said gesture frequency with preset gesture state, to acquire gesture transition state and output.

2. The gesture detection and recognition method of claim 1, wherein: said image is preprocessed before performing said step A2.

3. The gesture detection and recognition method of claim 1, wherein: each of said classifiers performs multi-scale target detection of said image through a preset sliding window, to obtain said gesture target.

4. The gesture detection and recognition method of claim 3, wherein: after said gesture target is obtained, said window is expanded by four times to detect said gesture target.

5. The gesture detection and recognition method of claim 1, wherein: said classifiers employ cascade classifiers.

6. A gesture detection and recognition system, wherein: the system comprises:
    an acquisition unit for collecting images;
    a storage unit connecting to said acquisition unit for storing said images;
    a plurality of classifiers for detecting different gestures connecting to said storage unit for detecting each frame of said images in a way of alternating every two frames in preset order, to obtain gesture target;
    a skin color modeling unit connecting to said storage unit for establishing skin color models based on pixel distribution in said target area of the gestures;
    a decision making unit connecting to a plurality of said classifiers and said skin color modeling units respectively, acquiring said gesture frequency of said gesture targets in two consecutive states according to the skin color model, and match said gesture frequency with preset gesture state, to acquire gesture transition state and output.

7. The gesture detection and recognition system of claim 6, wherein: said acquisition unit employs video camera.

8. The gesture detection and recognition system of claim 6, wherein: said classifiers employ cascade classifiers.

9. The gesture detection and recognition system of claim 6, wherein: said classifiers all perform multi-scale target detection of said image through a preset sliding window, to obtain said gesture target.

10. The gesture detection and recognition system of claim 9, wherein: after said classifiers obtain said gesture target, said window will be expanded by four times, to detect said gesture target.

11. A gesture detection and recognition method, comprising the steps of:
    providing an acquisition unit and a storage unit;
    acquiring and storing a plurality of images;
    providing a plurality of pre-set classifiers for detecting different gestures to detect each frame of said plurality of images according to a pre-set sequence in a frame alternating manner and acquiring a gesture target;
    providing a skin color modeling unit based upon a pixel distribution of a region of said gesture target; and
    providing a decision-making unit that acquires gesture frequencies of said gesture target in one of a previous state and a later state according to said skin color modeling unit.

* * * * *